US006311906B1

(12) United States Patent
Kim

(10) Patent No.: US 6,311,906 B1
(45) Date of Patent: Nov. 6, 2001

(54) APPARATUS AND METHOD FOR RECYCLING WASTE PAINT

(75) Inventor: Jeong Kon Kim, Lolsen (KR)

(73) Assignee: Sam Sin Mechanical Engineering Co., Ltd., Ulsan (KR)

( * ) Notice: Subject to any disclaimer, the term of this patent is extended or adjusted under 35 U.S.C. 154(b) by 0 days.

(21) Appl. No.: 09/359,589

(22) Filed: Jul. 26, 1999

(51) Int. Cl.[7] .......................... B02C 11/08; B01D 37/00; F26B 7/00

(52) U.S. Cl. .......................... 241/23; 241/24.12; 241/68; 210/770; 34/384; 34/423

(58) Field of Search .......................... 241/23, 68, 79, 241/24.1, 24.12, 24.18; 210/770, 774; 34/312, 315, 325, 384, 387, 390, 423, 428

(56) References Cited

U.S. PATENT DOCUMENTS 4,750,274 * 6/1988 Erdman, Jr. et al. .................... 34/39
4,980,030 * 12/1990 Johnson et al. .......................... 203/4
5,160,628 * 11/1992 Gerace et al. ....................... 210/667
5,215,625 * 6/1993 Burton ................................ 162/189
5,684,053 * 11/1997 Spangler ............................... 521/48
5,765,293 * 6/1998 St. Louis et al. ...................... 34/305
5,811,036 * 9/1998 Takahashi et al. ..................... 241/23
5,954,970 * 9/1999 St. Louis ............................. 210/710

* cited by examiner

*Primary Examiner*—Ed Tolan
(74) *Attorney, Agent, or Firm*—Jacobson Holman, PLLC

(57) ABSTRACT

There is disclosed apparatus and method for recycling waste paint, for completely removing a bad smell generated in the course of drying up the waste paint and extracting a bad smell from a filler. The method for recycling waste paint comprises the steps of: shaping the waste paint into a cake of a predetermine thickness while removing water from the waste paint using centrifugal force of a dehydrator; drying up and dehydrating the cake-shaped waste paint at about 80° C.~300° C. using a twin screw extruding method to remove water; drying up the waste paint dried up at the above step at about 100° C.~300° C. using a vacuum dry method to remove remaining water; pulverizing the waste paint dried up by the vacuum dry method into minute powder; separating the pulverized waste paint based upon density; and collecting and discharging dust, vapor, and gas generated during the above steps.

4 Claims, 2 Drawing Sheets

Figure 1:
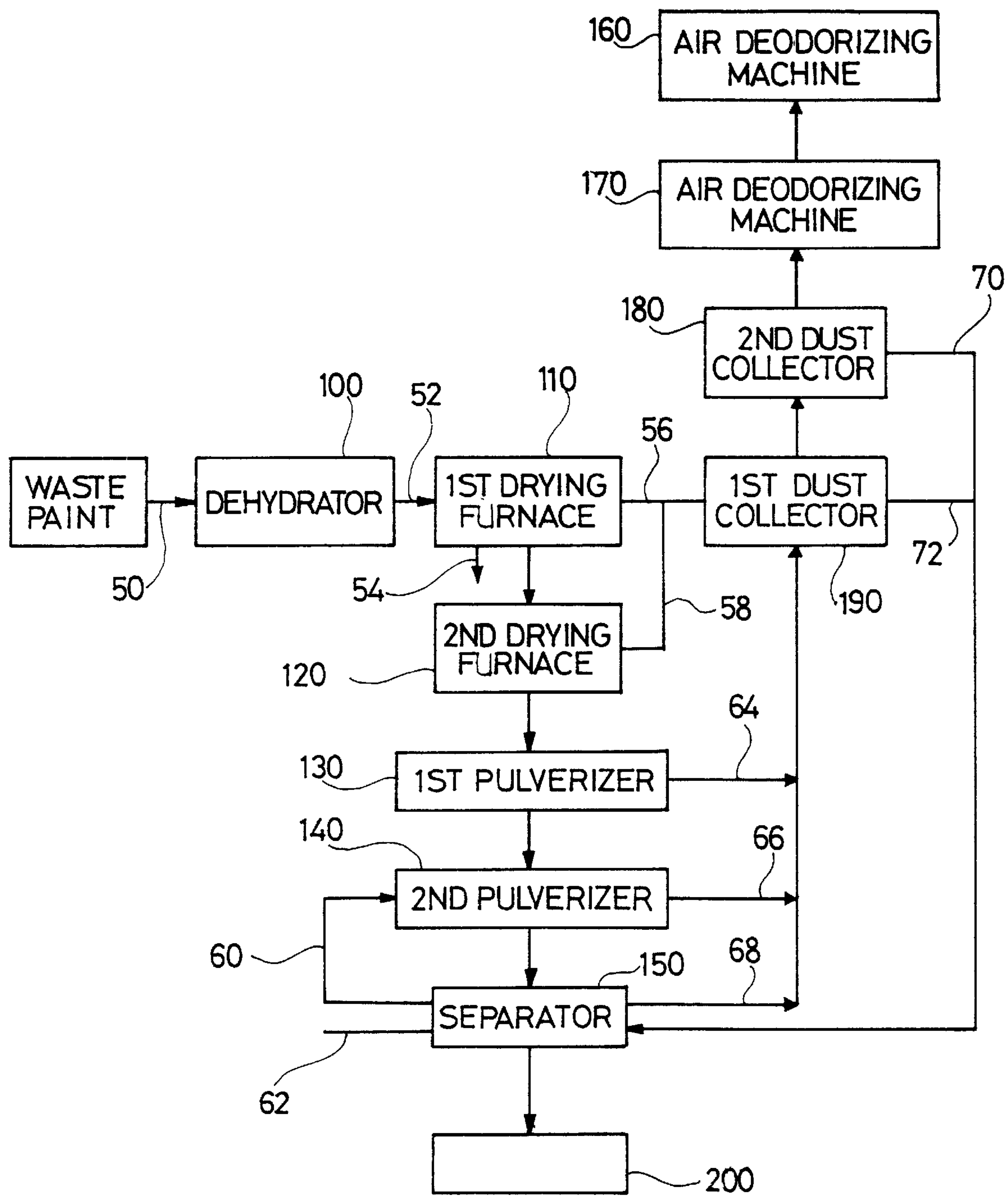

120
10
12
14
20
22
24
26
28
30
32
34
36
38
39
40a
40b
40c

APPARATUS AND METHOD FOR RECYCLING WASTE PAINT

BACKGROUND OF THE INVENTION

1. Field of the Invention

The present invention relates to waste paint generated during a painting operation and more particularly to apparatus and method for recycling waste paint to dry up the waste paint containing an amount of toxic substances in a vacuum dry method and completely remove water from the waste paint.

2. Description of Related Art

Typically, paint contains pigment, organic matter, inorganic matter, a drier, an additive, and resin. The paint has various physical properties in accordance with usage and contains an amount of water and thinner, thus having its unique smell. If waste paint generated during a painting operation is discharged as it is, it may cause environmental pollution such as air pollution, soil pollution, marine pollution, and water pollution, so it is defined as a particular toxic substance.

In a conventional treatment method, the waste paint is collected and burned up. However, this incineration of the waste paint costs a great deal and generates an amount of volatile organic compounds (VOC), causing secondary pollution.

To overcome the above problems, there have been developed methods and apparatus for recycling the waste paint. The method and apparatus for recycling the waste paint is disclosed in the application Ser. No. 96-6501 filed in Korea (the title of the invention is "Method and Apparatus for recycling waste paint") in detail. Specifically, in a course of drying up the waste paint, electromagnetic wave generated by a magnetron is used as a primary energy source and hot air generated by a hot blast stove is used as a secondary energy source to remove water from the waste paint.

However, the above method and apparatus for recycling waste paint using the electromagnetic wave does not allow mass production and good drying. Moreover, a terrible smell that is given off by drying of the waste paint and fillers generated from the recycling process not only ruins worker's health but also causes environmental pollution. The fillers cannot be reused because the conventional recycling method of waste paint cannot remove a terrible stink from the fillers.

SUMMARY OF THE INVENTION

Accordingly, the present invention is directed to apparatus and method for recycling waste paint that substantially obviates one or more of the limitations and disadvantages of the related art.

An objective of the present invention is to provide apparatus and method for recycling waste paint, which removes a bad smell generated in the course of drying up the waste paint.

Another objective of the present invention is to provide apparatus and method for recycling waste paint, which dries up the waste paint using a vacuum dry method, thereby reducing secondary pollution and allowing mass production.

Still another objective of the present invention is to provide apparatus and method for recycling waste paint, which removes a bad smell from fillers, thereby allowing reuse of the fillers.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a method for recycling waste paint comprises the steps of: shaping the waste paint into a cake of a predetermine thickness while removing water from the waste paint using centrifugal force of a dehydrator; drying up and dehydrating the cake-shaped waste paint at about 80° C.~300° C. using a twin screw extruding method to remove water; drying up the waste paint dried up at the above step at about 100° C.~300° C. using a vacuum dry method to remove remaining water; pulverizing the waste paint dried up by the vacuum dry method into minute powder; separating the pulverized waste paint based upon density; and collecting and discharging dust, vapor, and gas generated during the above steps.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

Figure 2:
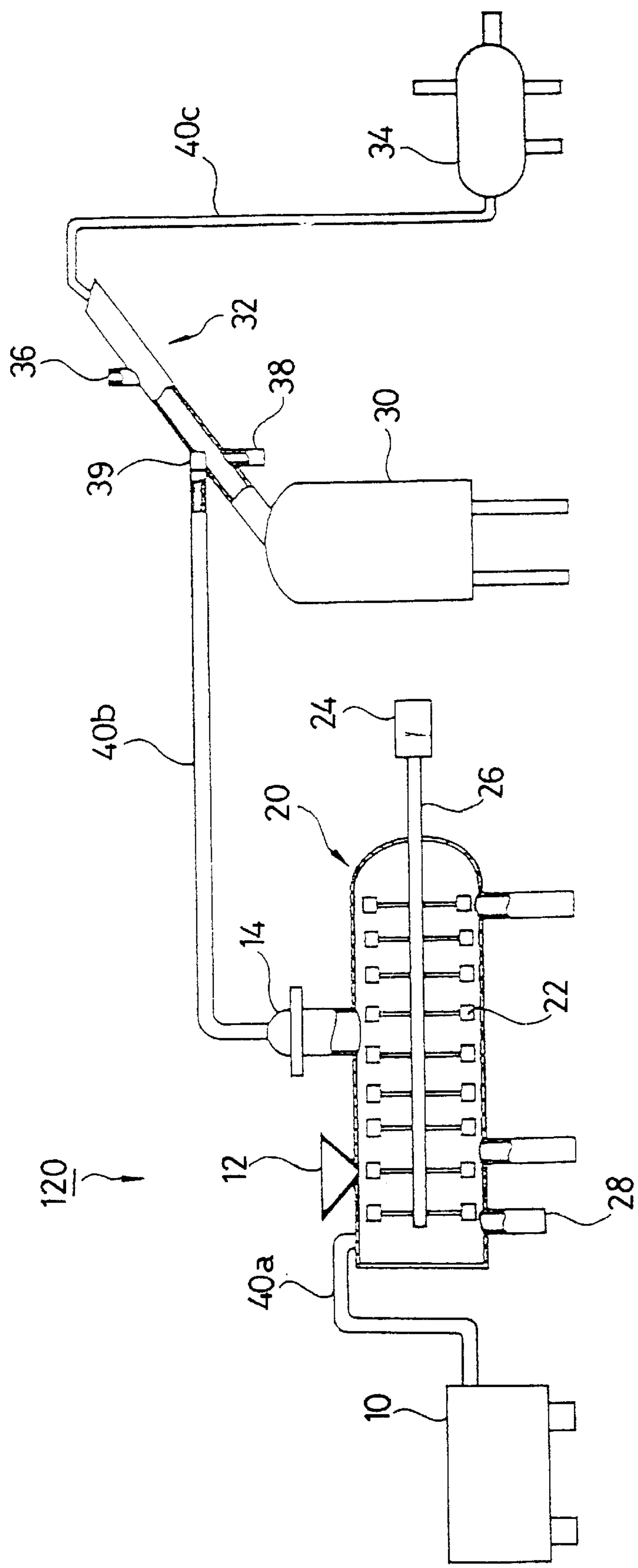

In the drawings:

FIG. 1 is a block diagram for showing processes of a method for recycling waste paint according to a preferred embodiment of the present invention; and FIG. 2 is a schematic diagram showing a configuration of a drying furnace of a waste paint recycling apparatus according to a preferred embodiment of the present invention.

DETAILED DESCRIPTION OF PREFERRED EMBODIMENT

The preferred embodiments of the present invention will now be described in detail referring to the accompanying drawings. It will be noted that the same elements in different drawings are designated by the same reference numerals. In describing the present invention, specific description of related known functions or structure that may confuse the essential subject of the present invention will be omitted.

FIG. 1 is a block diagram for showing processes of a method for recycling waste paint according to a preferred embodiment of the present invention. Referring to FIG. 1, the configuration of a waste paint recycling apparatus will be described.

A reference numeral 100 indicates a rotating dehydrator for shaping waste paint into a cake having a proper thickness using centrifugal force of a screw. A reference numeral 110 indicates a first drying furnace having a single or twin screw extending machine, for drying up the waste paint. A reference numeral 120 is a second drying furnace for drying up the waste paint dried up by the first drying furnace 110 once more using a vacuum drier. The configuration of the second drying furnace will be described later. A reference numeral 130 is a first pulverizer for pulverizing the waste paint dried up by the second drying furnace 120 and 140 indicates a second pulverizer for pulverizing the pulverized waste paint into minute powder. A reference numeral 150 is a separator for separating the waste paint that is pulverized into the minute powder by the second pulverizer 140 based upon density. A reference numeral 190 is a first dust collector for collecting dust, vapor, and gas generated from the first and second drying furnaces 110 and 120, the first and second pulverizers 130 and 140 and the separator 150. A reference numeral 180 is a second dust collector for collecting gas that is not filtered out by the first collector 190. Reference numerals 160 and 170 indicate air deodorizing machines for deodorization of the gas.

FIG. 2 is a schematic diagram showing a configuration of the second drying furnace for completely drying up the waste paint in a waste paint recycling apparatus according to a preferred embodiment of the present invention. The second drying furnace 120 comprises a boiler 10, a drying tank 20, and a vacuum pump 34. The boiler 10 is connected to the drying tank 20 via a pipe 40*a* and maintains the inside of the drying tank 20 at a predetermined temperature. The drying tank 20, which dries up the waste paint primarily dried up by the first drying furnace 110 once more, has a blade 22 mounted to a shaft 26 therewithin. The blade 22 receives driving force from a motor 24 and rotates to dry up the waste paint. In other words, an internal heat source (provided by the boiler) of the drying tank 20 is uniformly spread by the rotation of the blade 22, thus uniformly drying up the waste paint. A funnel-shaped hopper 12 and a filter 14 are mounted to the top of the drying tank 20. The filter 14 filters out gas and vapor generated in the course of drying up the waste paint. An outlet 28 for discharging the completely dried-up waste paint toward the first pulverizer 130 is mounted to the bottom surface of the drying tank 20. The filter 14 of the drying tank 20 is connected to a receiver pump 30 and the vacuum pump 34. That is, the upper end of the receiver pump 30 is connected to one end of a duct 32 and the other end of the duct 32 is connected to the vacuum pump 34 via a pipe 40*c*. An intermediate part of the duct 32 is connected to the filter 14 of the drying tank via a pipe 40*b*. The vacuum pump 34 continuously sucks the air in the drying tank 20 via the pipe 40*c*, the duct 32 and the pipe 40*b* to make vacuous. The receiver pump 30 sucks in the vapor and gas generated when the drying is performed at the drying tank 20. A condensing device 39 is mounted to a connecting portion of the pipe 40*b* and the duct 32 to condense the vapor and discharge the condensed water through a water outlet 38 that is mounted to the lower part of the duct 32. The gas and the vapor not condensed is discharged through a gas outlet 36 that is mounted to the upper part of the duct 32.

A method for recycling the waste paint by using such waste paint recycling apparatus including the drying furnace will now be described in detail with reference to FIGS. 1 and 2.

The waste paint recycling method comprises a dehydration step, a drying step, a dust collecting step, a pulverizing step, and a separating step. Primarily, collected waste paint is carried to the dehydrator 100 by a screw conveyor 50. The waste paint is shaped into a cake of a proper thickness while the water is removed from the waste paint by the dehydrator 100.

The cake-shaped waste paint is carried to the first drying furnace by a screw conveyer 52. The first drying furnace 110 dries up portions that was not dried up at the dehydration step using a twin screw extruding method while maintaining a temperature at about 80° C.~250° C. to reduce the water content of the waste paint to 10% or less. The water generated during the drying step is discharged through an outlet 54 and gas and vapor is delivered to the first dust collector 190 through a delivery pipe 56. The waste paint primarily dried up by the first drying furnace is carried to the second drying furnace 120 by a belt conveyer. The waste paint is dried up once more using a vacuum dry method at the proper temperature that is maintained by the heat source under forced vacuum in the second drying furnace. In other words, as shown in FIG. 2, the waste paint dried up by the first drying furnace 110 is fed to the drying tank 20 via the hopper 12. Subsequently, the boiler 10, the receiver pump 30, and the vacuum pump 34 are activated. The boiler 10 maintains the internal temperature of the drying tank 20 at about 100° C.~300° C. The vacuum pump 34 continuously sucks the air in the drying tank 20 to make the drying tank 20 be in a forced vacuous state. Simultaneously, the blade 22 is rotated by the driving force of the motor 24 and the resultant rotary power allows the uniform spread of the heat source within the drying tank 20. While the waste paint is dried up by the heat source of the boiler under the vacuous state, gas and vapor is generated. The vapor and gas passes through the filter 14. The vapor and gas that has passed through the filter 14 is flowed into the duct 32 through the pipe 40*b*. The vapor is condensed by the condensing device 39. The condensed vapor is discharged through the water outlet 38 by the driving force of the receiver pump 30. The gas and the vapor not condensed are discharged through the gas outlet 36. Here, the gas that is generated when drying up the waste paint is carbon monoxide (CO), carbon dioxide ($CO_2$), hydrogen ($H_2$), and formaldehyde. The vapor and gas that is discharged through the gas outlet 36 is delivered to the first dust collector 190 through a delivery pipe 58. Through the above operations, the waste paint is completely dried up in the second drying furnace 120. At this time, the water contained in the waste paint is less than 0.05%.

The waste paint completely dried up by the second drying furnace 120 is cooled by a cooling air and then carried to the first pulverizer 130 by the belt conveyer. The first pulverizer 130 pulverizes the dried-up waste paint into a predetermined size. Dust generated during the pulverization is flowed into the first dust collector 190 through a delivery pipe 64. Subsequently, the primarily pulverized waste paint is pulverized into minute powder by the second pulverizer 140 and deodorized with a deodorant. Dust generated during the second pulverizing step is flowed into the first dust collector 190 through a delivery pipe 66.

Thereafter, the waste paint pulverized into the minute powder is delivered to the separator 150. The separator 150 separates the waste paint of the minute powder into three classes of less than 200 meshes, 200 through 300 meshes, and more than 300 meshes to manufacture three kinds of products. A blower 62 for supplying the air is installed to the separator 150 to facilitate separation. The separator 150 also separates the waste paint inappropriate for the products from the other waste paint that is pulverized by the second pulverizer 140 and feeds back the inappropriate waste paint to the second pulverizer 140. Dust and vapor generated from the separator 150 is delivered to the first dust collector 190 through a delivery pipe 68.

The first dust collector 190 collects and filters out the dust, vapor, and gas generated from the first and second drying furnaces 110 and 120, the first and second pulverizers 130 and 140 and the separator 150. Thereafter, the vapor and gas that was not filtered out by the first dust collector 190 is delivered to the second dust collector 180 through a delivery pipe. Subsequently, the second dust collector 180 filters out the gas and vapor. The filtered gas is deodorized by the air deodorizing machines 170 and 160 and then discharged outside. Minute powder collected by the first and second dust collector 190 and 180 is returned to the separator 150 through circular delivery pipes 72 and 70.

Through such processes, the waste paint collected during the painting operation becomes a product 200 of minute powder.

As described above, the present invention dries up the waste paint just using the vacuum dry method instead of using the electromagnetic wave of the prior art, thus improving the efficiency in drying up the waste paint and realizing mass production. The present invention also removes a bad smell generated in the course of drying up the waste paint completely, thereby realizing comfortable working environment.

It will be apparent to those skilled in the art that various modifications and variations can be made in the apparatus and method for recycling waste paint of the present invention without deviating from the spirit or scope of the invention. Thus, it is intended that the present invention covers the modifications and variations of this invention provided they come within the scope of the appended claims and their equivalents.

What is claimed is:

1. An apparatus for recycling waste paint, comprising:

first and second drying furnaces for removing water from the waste paint;

a pulverizer for pulverizing the waste paint whose water is removed by said drying furnaces;

a separator for separating the waste paint that is pulverized into minute powder by said pulverizer based upon density; and a dust collector for collecting dust and gas generated from said drying furnaces, wherein said first drying furnace is constituted by a twin screw extruding device and said second drying furnace is constituted by a vacuum dry device; and wherein said second drying furnace comprises:

a drying tank for accommodating the waste paint whose water is removed by said first drying furnace;

a boiler for supplying a heat source to maintain the inside of said drying tank at a proper temperature;

a vacuum pump connected to said drying tank via a pipe, for making the inside of said drying tank in vacuum status; and a receiver pump connected between said drying tank and said vacuum pump, for sucking in gas and vapor generated from said drying tank in the course of drying up said waste paint.

2. The apparatus for recycling waste paint according to claim 1, wherein the first drying furnace is operated at a temperature between 80° C.–300° C.

3. The apparatus for recycling waste paint according to claim 1, wherein the second drying furnace is operated at a temperature between 100° C.–300° C. and said second drying furnace separates poisonous gas from the resultant matter.

4. The apparatus according to claim 1, wherein the apparatus uses a method for recycling the waste paint, the method comprising steps of:

shaping the waste paint into a cake of a predetermined thickness while removing water from the waste paint using centrifugal force of a dehydrator;

first drying up and dehydrating the cake-shaped waste paint at about 80° C.–300° C. using a twin screw extruding method to remove water;

second drying up the waste paint dried up at the first drying step at about 100° C.–300° C. using a vacuum dry method to remove remaining water;

pulverizing the waste paint dried up at the second drying step into minute powder;

separating the pulverized waste paint based upon density; and collecting and discharging generated dust, vapor, and gas.

* * * * *